(12) United States Patent
Cho

(10) Patent No.: US 9,086,079 B2
(45) Date of Patent: Jul. 21, 2015

(54) TWO-STAGE AIR CONTROL VALVE

(75) Inventor: Ho-Young Cho, Seoul (KR)

(73) Assignee: KOREA PNEUMATIC SYSTEM CO., LTD. (KR)

( * ) Notice: Subject to any disclaimer, the term of this patent is extended or adjusted under 35 U.S.C. 154(b) by 169 days.

(21) Appl. No.: 14/006,648

(22) PCT Filed: Feb. 16, 2012

(86) PCT No.: PCT/KR2012/001156
§ 371 (c)(1),
(2), (4) Date: Sep. 20, 2013

(87) PCT Pub. No.: WO2012/134056
PCT Pub. Date: Oct. 4, 2012

(65) Prior Publication Data
US 2014/0014206 A1 Jan. 16, 2014

(30) Foreign Application Priority Data
Mar. 31, 2011 (KR) ........................ 10-2011-0029306

(51) Int. Cl.
*F15B 13/043* (2006.01)
*F16K 1/12* (2006.01)
(Continued)

(52) U.S. Cl.
CPC ......... *F15B 13/0433* (2013.01); *F15B 13/0402* (2013.01); *F15B 13/0405* (2013.01);
(Continued)

(58) Field of Classification Search
CPC ............. F15B 13/0433; F15B 13/0405; F15B 13/0431; F15B 13/0426; F15B 13/0402; F16K 51/02; F16K 1/123; F16K 1/126

USPC ............ 137/629, 115.07, 115.13, 487.5, 495, 137/598, 500, 613, 614, 614.16, 614.19, 137/614.21
See application file for complete search history.

(56) References Cited

U.S. PATENT DOCUMENTS 3,916,946 A * 11/1975 Motzer ...................... 137/512.2
4,322,054 A    3/1982 Campbell
(Continued)

FOREIGN PATENT DOCUMENTS

JP       62-41474         2/1987
KR   10-1993-0000837 B1  2/1993
(Continued)

OTHER PUBLICATIONS

International Search Report (mailing date Aug. 22, 2012) for International PCT Patent Application PCT/KR2012/001156, filed on Feb. 16, 2012.

*Primary Examiner* — Kevin Lee
*Assistant Examiner* — Michael R Reid
(74) *Attorney, Agent, or Firm* — Joseph G. Chu; Vic Y. Lin; Innovation Capital Law Group, LLP

(57) ABSTRACT

The present invention applies to a vacuum transfer system, and relates to an air control valve for controlling the supply of compressed air in a vacuum transfer system. More specially, the air control valve of the present invention is configured to execute a two-stage control. The two-stage control is realized by a piston operation method, in which, although the control is performed by compressed air supplied thereto, a first control unit is operated by an electronic control method, and a second control unit is operated by a pneumatic control method. In particular, the second control unit is operated by vacuum pressure supplied from the vacuum transfer system. The air control valve of this invention can realize improved operational stability, improved energy efficiency and improved operational precision.

8 Claims, 5 Drawing Sheets

(51) Int. Cl.
  *F16K 51/02* (2006.01)
  *F15B 13/04* (2006.01)
  *F15B 13/042* (2006.01)
(52) U.S. Cl.
  CPC ......... *F15B13/0426* (2013.01); *F15B 13/0431* (2013.01); *F16K 1/123* (2013.01); *F16K 1/126* (2013.01); *F16K 51/02* (2013.01); *Y10T 137/7761* (2015.04); *Y10T 137/87917* (2015.04)

(56) References Cited

U.S. PATENT DOCUMENTS

| | | | |
|---|---|---|---|
| 4,339,897 A | | 7/1982 | Thompson et al. |
| 4,431,020 A | * | 2/1984 | Kowalski ................ 137/110 |
| 4,817,375 A | | 4/1989 | Brocard et al. |
| 4,861,114 A | | 8/1989 | Takata |
| 4,899,783 A | | 2/1990 | Yusko, Jr. et al. |
| 4,915,015 A | | 4/1990 | Richeson et al. |
| 4,930,464 A | | 6/1990 | Letsche |
| 4,961,413 A | | 10/1990 | Grey et al. |
| 5,193,495 A | | 3/1993 | Wood, III |
| 5,282,490 A | * | 2/1994 | Higgs ...................... 137/486 |
| 5,316,261 A | | 5/1994 | Stoner |
| 5,603,305 A | | 2/1997 | Miyake et al. |
| 5,713,315 A | | 2/1998 | Jyoutaki et al. |
| 6,230,734 B1 | * | 5/2001 | Grebnev et al. ............ 137/220 |
| 6,412,750 B1 | * | 7/2002 | Jun et al. ..................... 251/14 |
| 6,536,738 B2 | | 3/2003 | Inoue et al. |
| 2011/0193001 A1 | * | 8/2011 | Farner ................. 251/129.15 |

FOREIGN PATENT DOCUMENTS

| | | |
|---|---|---|
| KR | 10-0205513 B1 | 7/1999 |
| KR | 10-0476004 B1 | 3/2005 |

* cited by examiner though a two-stage control process using an electric signal and a pneumatic signal.

TWO-STAGE AIR CONTROL VALVE

TECHNICAL FIELD

The present invention relates, in general, to an air control valve and, more particularly, to a valve that controls the supply of compressed air in a vacuum transfer system.

BACKGROUND ART

Generally, a vacuum transfer system includes a vacuum pump that is operated by compressed air supplied thereto at a high speed, and a gripper from which air is expelled by the vacuum pump. Here, the vacuum transfer system is configured such that, when a negative pressure is produced in the vacuum pump and in the gripper, which holds an object to be transferred, the object can be transferred to a predetermined desired location by a robot unit.

In the vacuum transfer system, it is required to control the supply of the compressed air, and the present invention relates to a valve that executes the control of the supply of the compressed air.

A typical air control valve used in the vacuum transfer system is configured such that an outlet of the air control valve can be opened or closed by a piston that reciprocates in response to an on/off operation of an electronic control valve that is used to operate the air control valve. In other words, part of the compressed air that has been supplied into a valve casing through an inlet passes through the electronic control valve, and pressurizes the piston placed inside a piston chamber. Here, when the electronic control valve is in a turned on state, the electronic control valve moves the piston rearward and opens the outlet. However, when the electronic control valve is in a turned off state, the electronic control valve moves the piston forward and closes the outlet.

Although the air control valve having the above-mentioned construction is typically used in the vacuum transfer system, the related art air control valve is problematic as follows.

First, the above-mentioned valve construction that is configured to operate both the electronic control valve and the air control valve so as to realize the control of the supply of compressed air is not suitable for simple and repeated transfer work. That is, this valve construction should frequently repeat the on/off operation, so the valve construction consumes an excessive amount of electricity, reduces the expected life span of elements, and may cause malfunction. When the turned on state of the valve is continued in an effort to solve the problems, it is almost impossible to efficiently execute transfer work, and an excessive amount of energy may be wasted.

Second, the air control valve is configured to be operated by the on/off operation of the electronic control valve. Therefore, when the electronic control valve, as an example, fails to be operated normally, the air control valve may not control the operation of the vacuum transfer system.

Third, in the vacuum transfer system, it is practically required to determine the supply of compressed air or the stopping of the supply of the compressed air using the level of vacuum pressure formed in the vacuum pump or in an air exhaust chamber. In other words, the air control valve should be configured to be closed when the level of vacuum pressure reaches a predetermined sufficient level. However, the air control valve having the above-mentioned construction is operated in response to an electric signal, so the operational precision of the air control valve is reduced.

DISCLOSURE

Technical Problem

Accordingly, the present invention has been made keeping in mind the above problems occurring in the prior art air control valve, and an object of the present invention is to provide an air control valve that is configured such that it can be controlled by a two-stage control method, in which the two stages of the control method are operated in response to an electric signal and a pneumatic signal, respectively, so the air control valve of the present invention can realize improved operational stability; and improved energy efficiency and improved operational precision.

Technical Solution

The air control valve of the present invention includes:

a main body including a cylindrical housing provided with a compressed air passage channel therein such that the passage channel communicates with both an inlet and an outlet that are formed in first and second ends of the housing, a stopper fitted in a middle portion of the passage channel and forming a path at a location between left and right parts of the passage channel, and an electronic control valve mounted to an external surface of the housing;

a first control part including a hollow first piston moving between the inlet and the stopper, thereby opening or closing the path, and a first fluid line extending through the electronic control valve at a location to the inlet of the passage channel, and then extending leftward and rightward on an external surface of the first piston; and a second control part including: a hollow second piston moving between the stopper and the outlet, thereby opening or closing the outlet; and a second fluid line extending through a pneumatic control valve at a location to the outlet of the passage channel, and then extending leftward on an external surface of the second piston.

Here, the housing may be formed by a combination of a first body having the inlet with a second body having the outlet in such a way that the first and second bodies face each other.

Further, the stopper may be formed by a combination of a first stopper inserted into the first body with a second stopper inserted into the second body in such a way that the first and second stoppers face each other.

Advantageous Effects

The air control valve according to the present invention is a valve that is configured to be operated through the two-stage control process using an electric signal and a pneumatic signal. Practically, when the air control valve of this invention is used in a vacuum transfer system, the air control valve will be configured such that the control of the compressed air can be determined by a level of vacuum pressure that is produced in the vacuum pump or in the air exhaust chamber. Accordingly, unlike the prior art air control valve operated in response to an electric signal, the air control valve of the present invention is advantageous in that it can realize improved operational stability, improved energy efficiency and improved operational precision.

DESCRIPTION OF THE REFERENCE NUMERALS IN THE DRAWINGS

Figure 1:
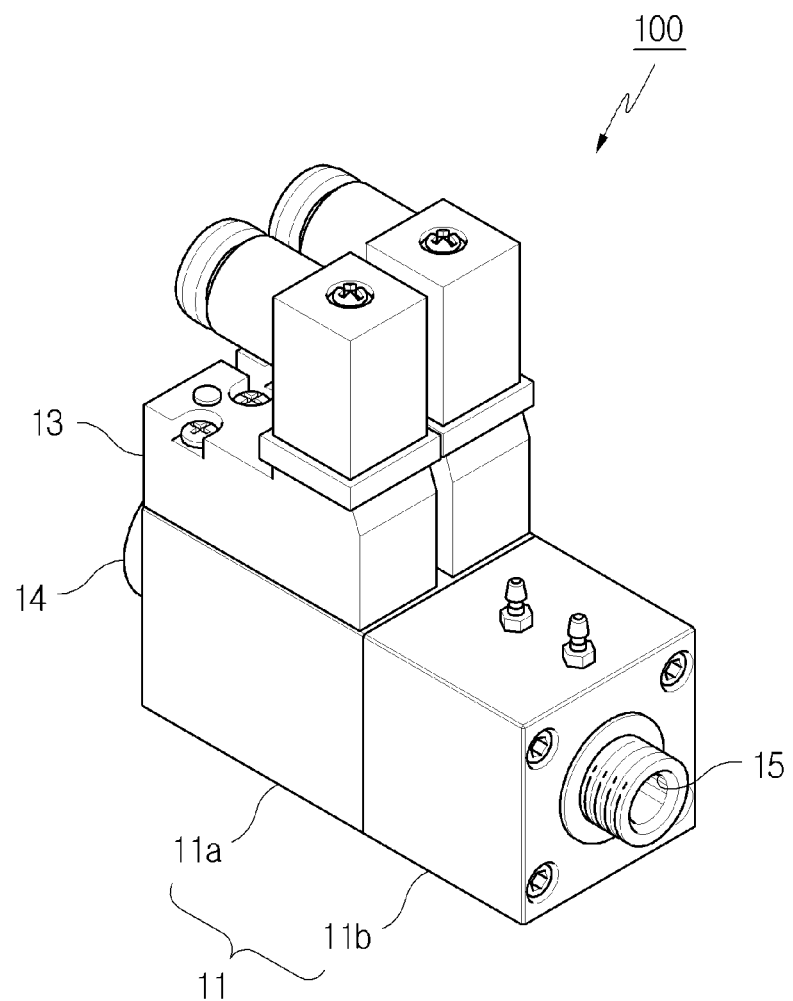
FIG. 1 is a perspective view of an air control valve according to the present invention.

| 100: air control valve | |
| --- | --- |
| 10: main body | 11: housing |
| 12: stopper | 13: electronic control valve |
| 14: inlet | 15: outlet |
| 16: passage channel | 17: path |
| 20: first control part | 21: first piston |
| 22: first fluid line | 23: protrusion |
| 30: second control part | 31: second piston |
| 32: second fluid line | 33: end |
| 34: through hole | 35: support step |
| 36: spring | 37: protrusion |
| 40: pneumatic control valve | |
| 41: casing | 42: diaphragm |
| 43: stem | 44: part |
| 45: air channel | |

BEST MODE

The above and other objects, features and other advantages of the present invention will be more clearly understood from the following detailed description of an embodiment when taken in conjunction with the accompanying drawings. In the drawings, FIGS. 2 to 5, reference numeral 10 denotes an air control valve according to the present invention.

Figure 2:
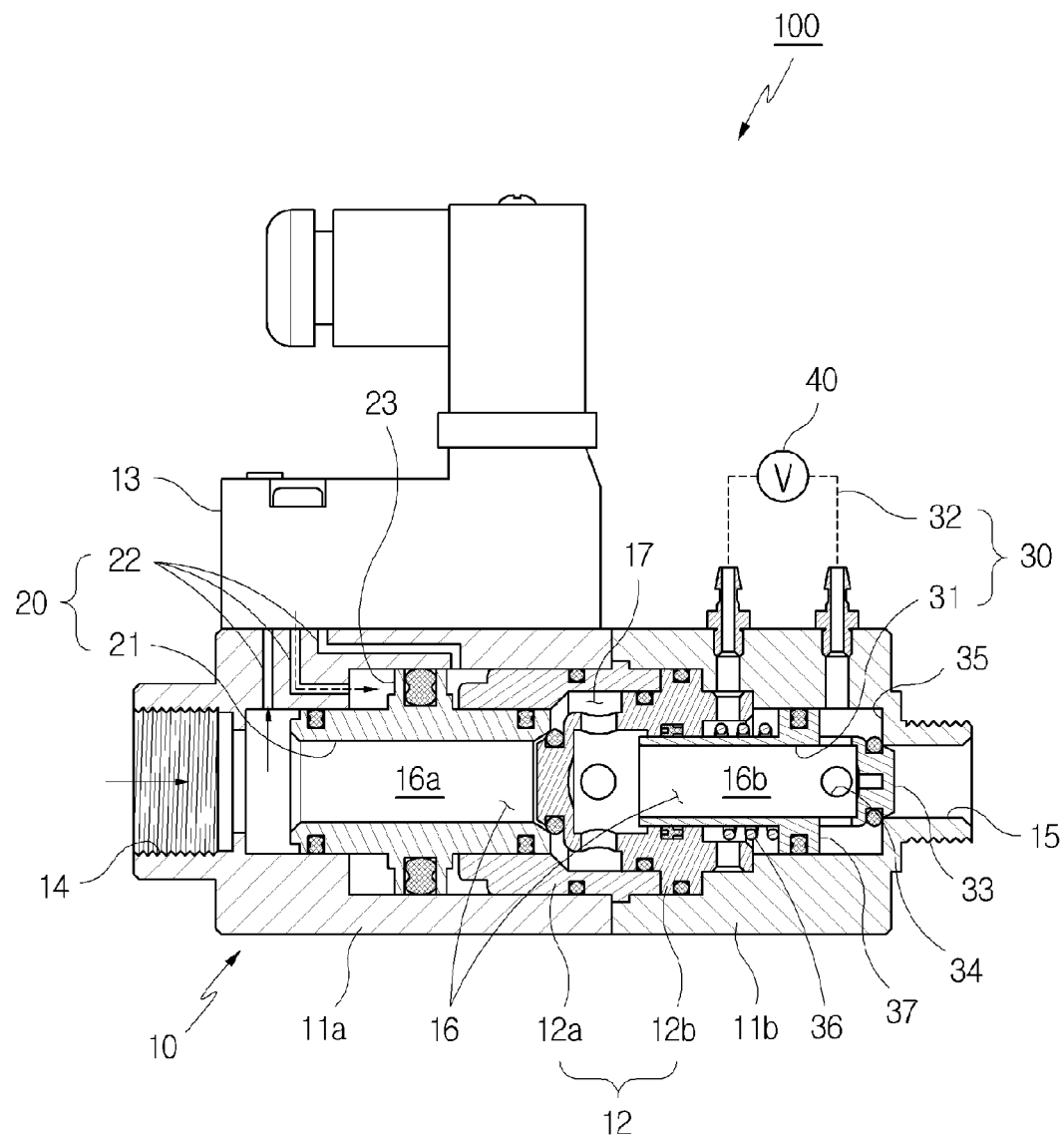
FIG. 2 is a sectional view taken along line A-A of FIG. 2.

As shown in FIGS. 1 and FIG. 2, the air control valve 100 of the present invention includes a main body 10, a first control part 20 and a second control part 30.

The main body 10 comprises a hollow cylindrical housing 11, a stopper 12 that is arranged inside the housing 11, and an electronic control valve 13 that is arranged outside the housing 11. Described in detail, the housing 11 is provided with a compressed air passage channel 16 therein, wherein the compressed air passage channel 16 communicates both with an inlet 14 that is formed in a first end of the housing 11 and with an outlet 15 that is formed in a second end of the housing 11. Further, the stopper 12 is fitted in the middle portion of the passage channel 16. Due to the stopper 12, the passage channel 16 is divided into left and right parts that are left and right passage channels 16a and 16b, with a narrow path 17 formed between the left and right passage channels 16a and 16b.

The housing 11 is formed by a combination of a first body 11a and a second body 11b which face with each other. Here, the first body 11a has the inlet 14 formed in the first end of the housing 11, and the second body 11b has the outlet 15 formed in the second end of the housing 11. Of course, in another embodiment, the housing 11 may be formed as a single body. However, in this case, the passage channel 16 of the integrated single housing 11 is too long, so it is very difficult to machine the passage channel 16 in the integrated single housing 11 and substandard quality products may be easily produced. In an effort to overcome the problems, the housing 11 of the present embodiment is produced as two separate parts. Thus, the present invention is advantageous in that it can easily produce the housing 11, and can reduce the size and weight of the housing 11.

Further, the stopper 12 is formed by a combination of a first stopper 12a with a second stopper 12b in such a way that the two stoppers 12a and 12b face each other. Here, the first stopper 12a is inserted into the first body 11a, and the second stopper 12b is inserted into the second body 11b. In the present embodiment, the design of the separated structure of the stopper 12 is intended to solve the problems that may be experienced in the machining of the stopper when the stopper is formed as a single body. The design is also intended to solve the difficulty that may be experienced when forming and assembling the stopper 12, the first control part 20 and the second control part 30 in the housing 11.

The electronic control valve 13 is a typical electronic control valve that is mounted to the external surface of the housing 11, and forms part of fluid line of the first control part 20, and controls the on/off operation of the fluid line.

The first control part 20 includes a hollow first piston 21 that is movably placed in the passage channel 16 of the housing 11, and a first fluid line 22 that is formed in the first control part 20 so as to actuate the first piston 21. Described in detail, the first piston 21 is placed in the left passage channel 16a at a location between the inlet 14 and the first stopper 12a, and moves to the left and right, thereby closing and opening the path 17. Here, the first piston 21 should be free from disturbing the flow of compressed air, so the first piston 21 is configured as a hollow piston, particularly, a hollow cylindrical piston.

The path 17 that functions to make the left and right passage channels 16a and 16b be operated in conjunction with each other is formed at a location to the edge of the stopper 12. Here, the path 17 is configured such that, when the first piston 21 is moved and the end of the piston 21 comes into contact with the stopper 12, the path 17 becomes sealed.

The first fluid line 22 extends through the wall of the first body 11a of the housing 11 at a location to the side of the inlet 14 of the passage channel 16, and passes through the electronic control valve 13, and then extends leftward and rightward at a location outside the first piston 21. Here, it should be understood that the above directional terms "leftward" and "rightward" mean the opposite moving directions of the first piston 21. As shown in the drawings, a protrusion 23 is formed on the external surface of the first piston 21, and the directions of leftward and rightward in the present embodiment are determined based on the protrusion 23.

The second control part 30 includes a hollow second piston 31 that is movably placed in the passage channel 16 of the housing 11, and a second fluid line 32 that is formed in the second control part 30 so as to actuate the second piston 31. Described in detail, the second piston 31 is placed in the right passage channel 16b at a location between the outlet 15 and the second stopper 12b, and moves to the left and right, thereby opening and closing the outlet 15.

The second piston 31 is closed at one end 33 thereof, with a through hole 34 formed through the sidewall of the closed end 33 such that the through hole 34 communicates with the outlet 15 via a support step 35 provided at a location to the outlet 15. The second piston 31 is configured such that, when the second piston 31 is moved so that the closed end 33 thereof comes into contact with the outlet 15, the piston 31 closes the outlet 15. In the drawings, reference numeral 36 denotes a spring that is concentrically placed around the external surface of the second piston 31 and biases the second piston 31 in a direction toward the outlet 15.

The second fluid line 32 extends through the wall of the second body 11b of the housing 11 at a location to the outlet 15 of the passage channel 16, wherein the outlet 15 communicates with the through hole 34. The second fluid line 32 passes through a pneumatic control valve 40, and then extends to the left at a location outside the second piston 31. As shown in the drawings, a protrusion 37 is formed on the external surface of the second piston 31, and the direction of leftward in this embodiment is determined based on the protrusion 37. In a normal state, the first end of the spring 36 elastically biases the protrusion 37, so the closed end 33 of the second piston 31 comes into contact with the outlet 15.

The air control valve 100 of the present invention having the above-mentioned construction can be used in a vacuum transfer system, and controls the supply of compressed air to the vacuum pump, thereby allowing or stopping the supply of compressed air to the vacuum pump.

Figure 3:
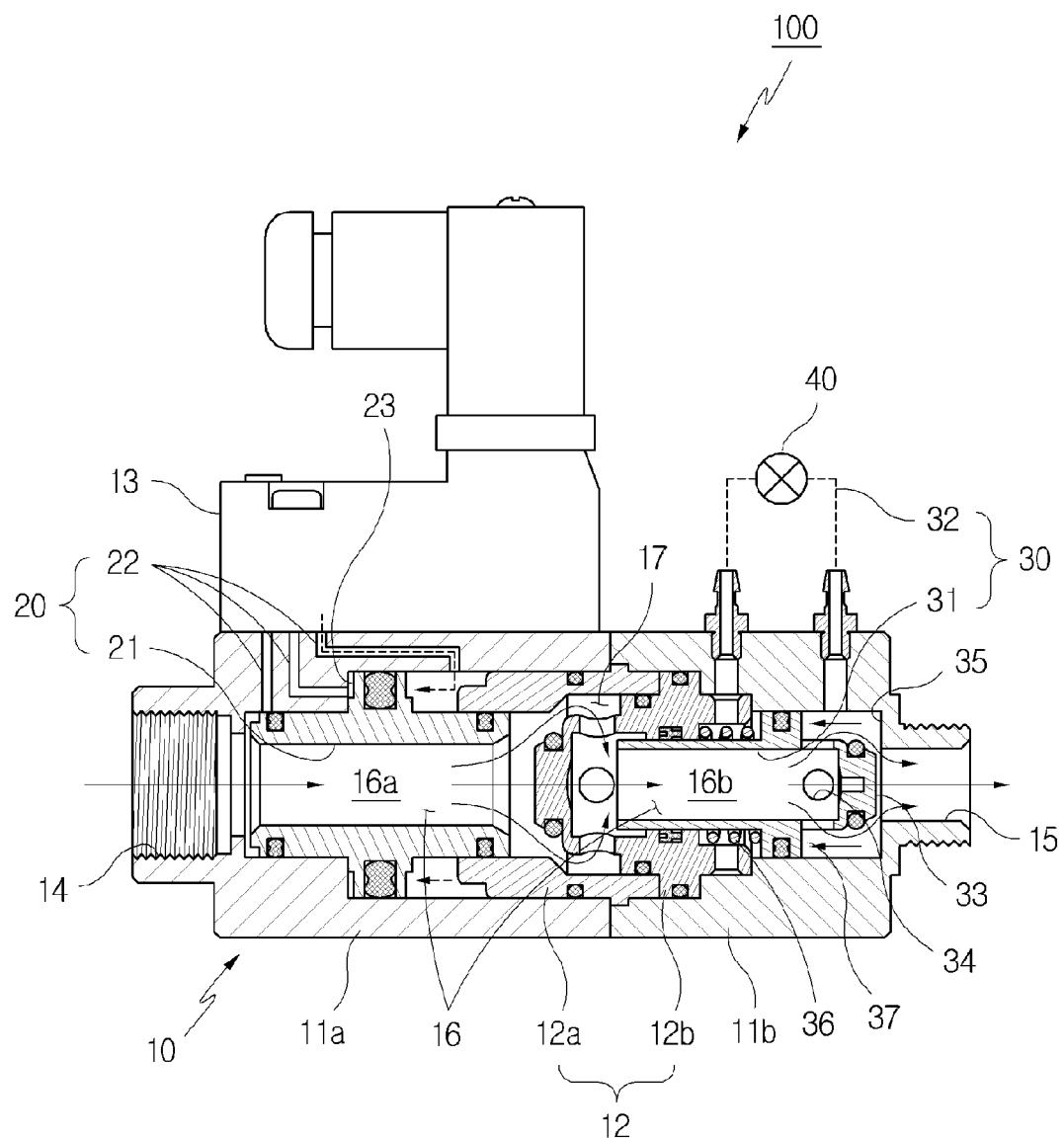
FIG. 3 is a view illustrating an operational function of an air control valve according to the present invention.

As shown in FIG. 3, when the electronic control valve 13 is turned on, compressed air that is supplied to the valve through the inlet 14 pushes the first piston 21 from the right while passing through the first fluid line 22, thereby moving the first piston 21 to the left. This leftward movement of the first piston 21 opens the path 17, so the compressed air passes through the left passage channel 16a and through the path 17, and then flows into the right passage channel 16b. Thereafter, the compressed air is discharged from the through hole 34 of the second piston 31.

The compressed air discharged from the through hole 34 rushes into and is resisted by the support step 35, thereby flowing backward. The compressed air that flows backward pushes the second piston 31 to the left with a pressure higher than the biasing force of the spring 36, thereby moving the piston 31 to the left. This leftward movement of the piston 31 opens the outlet 15, so the compressed air that has been supplied into the inlet 14 sequentially passes through the left passage channel 16a, the path 17, the right passage channel 16b, the through hole 34 and the outlet 15, and is then supplied to the vacuum pump.

When the vacuum pump is operated by the supplied compressed air, a vacuum and a negative pressure are produced in the vacuum pump and in the gripper, respectively, so the object to be transferred can be attached to the gripper by a suction force. Until this time, both the pneumatic control valve 40 and the second fluid line 32 are maintained in respective closed states.

Figure 4:
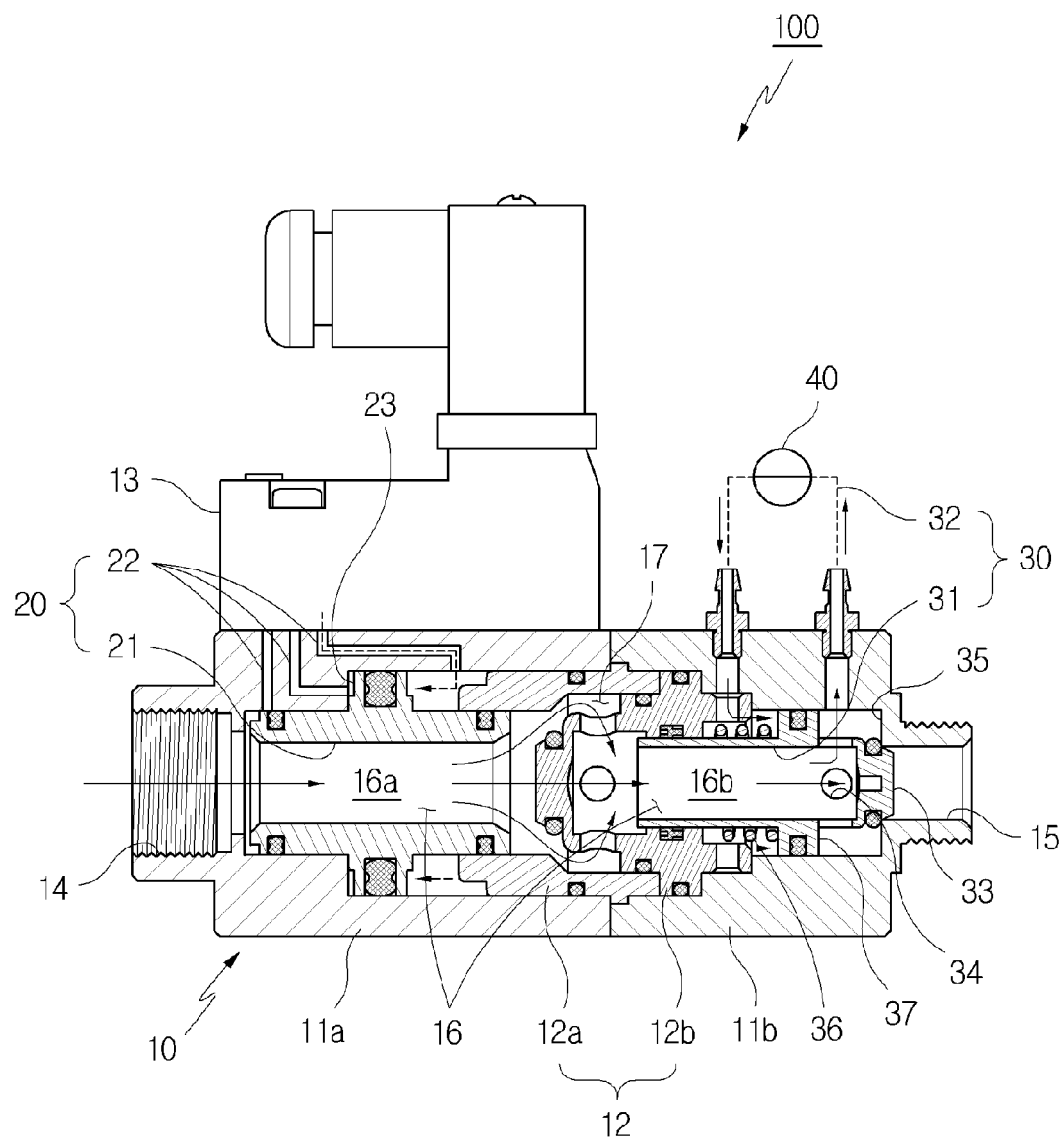
FIG. 4 is a view illustrating another operational function of an air control valve according to the present invention.

As shown in FIG. 4, when the vacuum pressure reaches a predetermined level, the pneumatic control valve 40 is opened by the vacuum pressure. In the above state, compressed air that has passed through the through hole 34 passes through the second fluid line 32, and pressurizes the second piston 31 from the left, thus moving the second piston 31 to the right. Due to this operation, the end 33 of the second piston 31 comes into contact with the end having the outlet 15, so that the outlet 15 is closed. In the above state, although the electronic control valve 13 is in a turned on state, the supply of compressed air is stopped. Of course, when the level of vacuum pressure is reduced, both the pneumatic control valve 40 and the second fluid line 32 are closed, so the air control valve is returned to the state shown in FIG. 3.

FIGS. 3 and 4 illustrate an operation in which compressed air is supplied and blocked in a state in which the electronic control valve 13 is in a turned on state. However, when the state of the electronic control valve 13 is changed from the turned on state into a turned off state, compressed air that has been supplied into the inlet 14 passes through the first fluid line 22 and pressurizes the first piston 21 from the left, thus moving the first piston 21 to the right, as shown in FIG. 2. This operation closes the path 17, and blocks the supply of compressed air.

Figure 5:
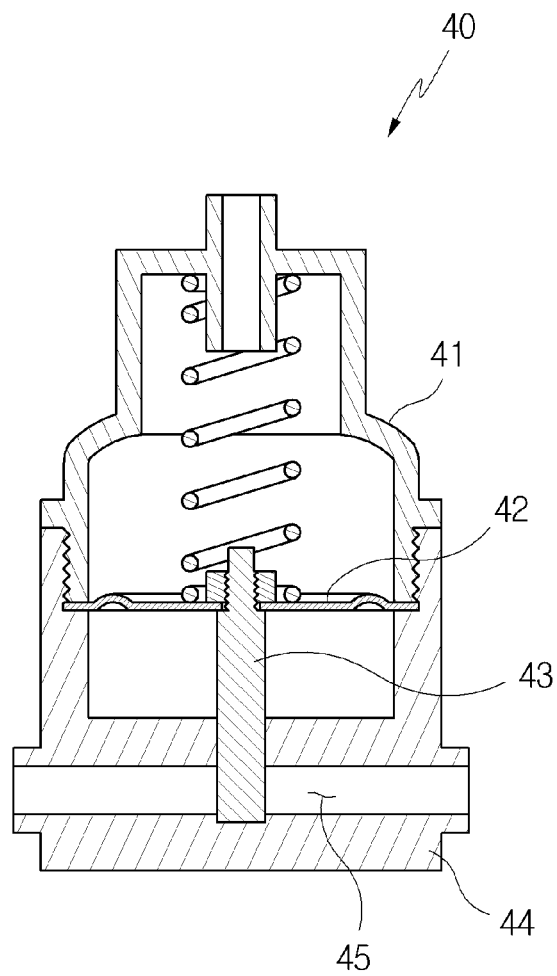
FIG. 5 is view illustrating an example of a pneumatic control valve used in the air control valve of the present invention.

FIG. 5 illustrates an example of the pneumatic control valve 40 used in the present embodiment. As shown in the drawing, the pneumatic control valve 40 includes a diaphragm 42 that is elastically held in the casing 41 and moves vertically upward and downward by the vacuum pressure, a stem 43 the first end of which is combined with the diaphragm 42 and the second end of which extends downward, and a part 44 provided with an air channel 45 that is opened and closed by the stem 43 moving vertically upward and downward in response to movement of the diaphragm 42. Here, the air channel 45 forms a part of the second fluid line 32.

For example, when a desired level of vacuum pressure is not produced in the vacuum pump, the stem 42 closes the air channel 44 by a spring force. FIG. 3 illustrates the state in which the stem 42 closes the air channel 44 by the spring force. In the above state, compressed air is continuously supplied into the vacuum pump as described above. When the desired level of vacuum pressure is produced in the vacuum pump, the diaphragm 42 and the stem 43 are moved upward by the vacuum pressure, thus opening both the air channel 44 and the second fluid line 32. FIG. 4 illustrates the state in which both the air channel 44 and the second fluid line 32 are opened. In the above state, the supply of compressed air is stopped as described above.

The pneumatic control valve 40 may be preferably used in the present invention. However, it should be understood that the present invention is not limited to the specified construction of the pneumatic control valve, but the construction of the pneumatic control valve may be freely and variously designed in another embodiment.

As described above, during the operation of the air control valve 100 according to the present invention, compressed air is processed through the two-stage control process that is executed in the first control part 20 and in the second control part 30, wherein the first stage control is executed by an electric signal and the second stage control is executed by a pneumatic signal. Accordingly, the present invention can realize improved operational stability, improved operational precision and improved energy efficiency of the air control valve.

The invention claimed is:

1. A two-stage air control valve, comprising:
a main body including: a cylindrical housing provided with a compressed air passage channel therein such that the passage channel communicates with both an inlet and an outlet that are formed in first and second ends of the housing; a stopper fitted in a middle portion of the passage channel and forming a path at a location between left and right parts of the passage channel; and an electronic control valve mounted to an external surface of the housing;
a first control part including: a hollow first piston moving between the inlet and the stopper, thereby opening or closing the path; and a first fluid line extending through the electronic control valve to the inlet of the passage channel, and then branching to either side of an external surface of the first piston; and
a second control part including: a hollow second piston moving between the stopper and the outlet, thereby opening or closing the outlet; and a second fluid line extending through a pneumatic control valve at a location to the outlet of the passage channel, and then extending leftward on an external surface of the second piston.

2. The two-stage air control valve as set forth in claim 1, wherein the housing is formed by a combination of a first body having the inlet with a second body having the outlet in such a way that the first and second bodies face each other.

3. The two-stage air control valve as set forth in claim 2, wherein the stopper is formed by a combination of a first stopper inserted into the first body with a second stopper inserted into the second body in such a way that the first and second stoppers face each other.

4. The two-stage air control valve as set forth in claim 1, wherein the path is formed at a location to an edge of the stopper, wherein the path is configured such that, when the first piston is moved and an end of the first piston comes into contact with the stopper, the path becomes sealed.

5. The two-stage air control valve as set forth in claim 1, wherein the second piston is closed at an end thereof, with a through hole formed through a sidewall of the closed end such that the through hole communicates with the outlet via a support step provided at a location to the outlet, wherein the second piston is configured such that, when the second piston is moved so that the closed end comes into contact with the outlet, the second piston closes the outlet.

6. The two-stage air control valve as set forth in claim 5, wherein the second fluid line extends through a wall of the housing at a location to the outlet of the passage channel communicating with the through hole, and passes through the pneumatic control valve, and then extends leftward at a location outside the second piston.

7. The two-stage air control valve as set forth in claim 1, wherein the pneumatic control valve is opened and closed by a vacuum pressure.

8. The two-stage air control valve as set forth in claim 7, wherein the pneumatic control valve comprises: a diaphragm that is elastically held in a casing such that the diaphragm moves vertically upward and downward by the vacuum pressure; a stem having a first end that is combined with the diaphragm, and a second end that extends downward; and a part provided with an air channel that forms a part of the second fluid line and is opened and closed by vertical movement of the stem.

* * * * *